United States Patent
Jang

(10) Patent No.: US 12,507,720 B2
(45) Date of Patent: Dec. 30, 2025

(54) USE OF ANTHOCYANIN-ANIONIC POLYSACCHARIDE COMPLEX FOR PREVENTING OR TREATING INFLUENZA VIRUS A INFECTION

(71) Applicant: JBKLAB CO., LTD., Gyeonggi-do (KR)

(72) Inventor: Bong Keun Jang, Gyeonggi-do (KR)

(73) Assignee: JBKLAB CO., LTD., Gyeonggi-Do (KR)

( * ) Notice: Subject to any disclaimer, the term of this patent is extended or adjusted under 35 U.S.C. 154(b) by 898 days.

(21) Appl. No.: 17/621,846

(22) PCT Filed: Jun. 24, 2020

(86) PCT No.: PCT/KR2020/008235
§ 371 (c)(1),
(2) Date: Dec. 22, 2021

(87) PCT Pub. No.: WO2020/262964
PCT Pub. Date: Dec. 30, 2020

(65) Prior Publication Data
US 2022/0279829 A1  Sep. 8, 2022

(30) Foreign Application Priority Data

Jun. 25, 2019  (KR) .................. 10-2019-0075991

(51) Int. Cl.
*A23L 33/105* (2016.01)
*A61K 8/49* (2006.01)
(Continued)

(52) U.S. Cl.
CPC ............ *A23L 33/105* (2016.08); *A61K 8/498* (2013.01); *A61K 8/733* (2013.01); *A61K 31/352* (2013.01);
(Continued)

(58) Field of Classification Search
None
See application file for complete search history.

(56) References Cited

U.S. PATENT DOCUMENTS

2019/0083392 A1  3/2019  Bombardelli
2022/0249675 A1  8/2022  Jang

FOREIGN PATENT DOCUMENTS

EP  3429607 A1  1/2019
EP  3978025 A1  4/2022
(Continued)

OTHER PUBLICATIONS

English language translation of KR 10-2012-0126587 A, Publ. Nov. 21, 2012. (Year: 2012).*
(Continued)

*Primary Examiner* — Dominic Lazaro
(74) *Attorney, Agent, or Firm* — LEYDIG, VOIT & MAYER, LTD.

(57) ABSTRACT

The present invention relates to a use of an anthocyanin-anionic polysaccharide complex for preventing or treating influenza virus A infection and, more specifically, to a pharmaceutical composition, a food/health functional food/health aid food composition, and a quasi-drug composition, each comprising an anthocyanin-anionic polysaccharide complex as an active ingredient for preventing or treating influenza virus A infection diseases. A composition comprising an anthocyanin-anionic polysaccharide complex as an active ingredient provided in the present invention exhibits excellent anti-viral activity against influenza virus A and
(Continued)

as such, can find very advantageous applications in developing an agent for prevention or treatment of diseases caused by influenza virus A infection.

5 Claims, 8 Drawing Sheets

(51) Int. Cl.

| | |
|---|---|
| *A61K 8/73* | (2006.01) |
| *A61K 31/352* | (2006.01) |
| *A61K 31/734* | (2006.01) |
| *A61K 47/61* | (2017.01) |
| *A61P 31/16* | (2006.01) |
| *A61Q 19/10* | (2006.01) |

(52) U.S. Cl.
CPC ............ *A61K 31/734* (2013.01); *A61K 47/61* (2017.08); *A61P 31/16* (2018.01); *A61Q 19/10* (2013.01)

(56) References Cited

FOREIGN PATENT DOCUMENTS

| | | | | |
|---|---|---|---|---|
| JP | 2001-316399 | A | | 11/2001 |
| JP | 2019-508470 | A | | 3/2019 |
| KR | 10-2012-0126587 | A | | 11/2012 |
| KR | 20120126587 | A | * | 11/2012 |
| KR | 10-2018-0009627 | A | | 1/2018 |
| KR | 10-2018-0123042 | A | | 11/2018 |
| KR | 10-2019-0047626 | A | | 5/2019 |

OTHER PUBLICATIONS

Swaminathan, K., et al., Binding of a natural anthocyanin inhibitor to influenza neuraminidase by mass spectrometry, Anal. Bioanal. Chem., 405 (2013) pp. 6563-6572. (Year: 2013).*

Zakay-Rones, et al., Randomized Study of the Efficacy and Safety of Oral Elderberry Extract in the Treatment of Influenza A and B Virus Infections, J. Int .. Med. Res., 32 (2004) pp. 132-140. (Year: 2004).*

Zakay-Rones, et al., Inhibition of Several Strains of Influenza Virus in Vitro and Reduction of Symptoms by an Elderberry Extract (*Sambucus nigra* L.) during an Outbreak of Influenza B Panama, J. Altern. Complement. Med., 1 (1995) pp. 361-369. (Year: 1995).*

Hayashi et al., "Anti Influenza Virus Activity of a Red-Fleshed Potato Anthocyanin", Food Science and Technology Research, vol. 9, No. 3, Jan. 1, 2003 (Jan. 1, 2003), pp. 242-244.

International Search Report and Written Opinion received for PCT Patent Application No. PCT/KR2020/008235, mailed on Oct. 19, 2020, 18 pages (9 pages of English Translation and 9 pages of Original Document).

Masuda, "Influenza virus," Nichiotonose, vol. 118, 2015, pp. 904-907.

Hwang et al., "Effects of Different Growing Regions on Quality Characteristics, Bioactive Compound Contents, and Antioxidant Activity of Aronia (*Aronia melanocarp*) in Korea", Prev. Nutr. Food Sci., 2016, 21(3): 255-263.

* cited by examiner

Phosphate Buffer Saline (PBS) pH 7.4
Room temperature
Max Ab of ATC complex in pH 7.4 sol : 520nm

USE OF ANTHOCYANIN-ANIONIC POLYSACCHARIDE COMPLEX FOR PREVENTING OR TREATING INFLUENZA VIRUS A INFECTION

CROSS REFERENCE TO RELATED APPLICATIONS

This patent application is a nationalization of and claims priority to PCT Application No. PCT/KR2020/008235 filed on Jun. 24, 2020 entitled "USE OF ANTHOCYANIN-ANIONIC POLYSACCHARIDE COMPLEX FOR PREVENTING OR TREATING INFLUENZA VIRUS A INFECTION," which claims priority to Korean Patent Application 10-2019-0075991, filed Jun. 25, 2019. Each of the aforementioned applications is incorporated by reference herein in their entirety.

BACKGROUND OF THE INVENTION

1. Field of the Invention

The present invention relates to a use of an anthocyanin-anionic polysaccharide complex for preventing or treating influenza virus A infection and, more specifically, to a pharmaceutical composition, a food composition and a quasi-drug composition, each comprising an anthocyanin-anionic polysaccharide complex as an active ingredient for preventing or treating influenza virus A infection diseases.

2. Description of the Related Art

Influenza is an acute respiratory disease caused by influenza virus belonging to Orthomyxoviridae. Influenza virus is a single strand RNA virus, which is classified into three types A, B, and C according to the antigenicity of nucleoprotein (NP) and matrix antigen, and is divided into 16 subtypes (H1-H16) according to the type of hemagglutinin (HA), a glycoprotein protruding from the virus envelope, and is further classified into 9 subtypes (N1-N9) according to the type of neuraminidase. Hemagglutinin is the most important antigenic determinant, and it binds to the sialic acid receptor on the surface of the host cell to facilitate the penetration of the virus into the host. Neuraminidase catalyzes the separation of virions by removing sialic acid from the host cell, and prevents virion aggregation, allowing the newly created virus to be easily released. In addition, M2 protein, which is present in a small amount in the viral membrane protein, acts as an ion channel to control the pH inside the virus, thereby exposing viral RNA into the host cell.

Among them, influenza A is a zoonotic infectious agent that infects animals and humans and has a strong contagiousness, causing a global pandemic and causing many casualties in human history. Spanish flu, which was highly contagious from 1918 to 1920 and swept in Europe, killed about 40 million people, making it the deadliest flu in history. In March 2009, novel influenza virus A H1N1 spread worldwide, resulting in more than 10,000 deaths. In Korea, this resulted in more than 860,000 confirmed cases and 270 deaths. In addition, according to a study by National Evidence-based Healthcare Collaborating Agency, it is estimated that 2,370 people die annually due to seasonal influenza.

Vaccine development as a preventive method against influenza virus requires a facility with a high level of safety and a technology to obtain a high yield. In addition, it takes a lot of time for the development because additional research is required according to the viral protein mutation, and accordingly, a considerable cost is required. In addition to the vaccine development, antiviral agents have been developed and used as antiviral treatments. Antiviral agents commonly used include amantadine, rimantadine, zanamivir, and oseltamivir. Amantadine and rimantadine have antiviral activity by inhibiting the activity of M2 protein, and oseltamivir and zanamivir have antiviral activity by inhibiting neuraminidase present in the viral outer membrane. However, influenza viruses with resistance to these antiviral agents have been reported recently, and their use is limited due to the production period and licensing issues of the antiviral agents. In addition, oseltamivir, the most commonly used, has a side effect of severe vomiting. Although zanamivir has a high antiviral effect, it has the disadvantages of low bioavailability and rapid renal excretion.

Most of the anti-influenza agents developed so far show side effects. Therefore, there is an urgent request to develop a therapeutic agent for influenza A virus infection diseases based on natural products that is effective for the prevention and treatment of influenza but has no side effects.

SUMMARY OF THE INVENTION

Accordingly, the present inventors repeated intensive research to develop a natural product-based therapeutic agent for influenza virus A infection disease. As a result, the present inventors have found that the stability of anthocyanin can be improved through complex formation using anthocyanin with excellent pharmacological activity and negatively charged polysaccharides to further inhibit infection of influenza virus A, and completed the present invention.

It is an object of the present invention to provide a pharmaceutical composition comprising an anthocyanin-anionic polysaccharide complex as an active ingredient for the prevention or treatment of influenza virus A infection disease.

It is another object of the present invention to provide a food composition, a health functional food composition or a health supplement food composition comprising an anthocyanin-anionic polysaccharide complex as an active ingredient for the prevention or amelioration of influenza virus A infection disease.

It is another object of the present invention to provide a quasi-drug composition comprising an anthocyanin-anionic polysaccharide complex as an active ingredient for the prevention of influenza virus A infection.

It is another object of the present invention to provide a method for preventing or treating influenza virus A infection disease comprising a step of administering the pharmaceutical composition comprising an anthocyanin-anionic polysaccharide complex as an active ingredient for the prevention or treatment of influenza virus A infection disease to a mammal including humans in a therapeutically effective amount.

It is another object of the present invention to provide a use of the pharmaceutical composition comprising an anthocyanin-anionic polysaccharide complex as an active ingredient for the prevention or treatment of influenza virus A infection disease for the manufacture of a preparation for influenza virus A infection disease.

It is another object of the present invention to provide a use of the pharmaceutical composition comprising an anthocyanin-anionic polysaccharide complex as an active ingredient for the prevention or treatment of influenza virus A infection disease for the treatment of influenza virus A infection disease.

To achieve the above objects, the present invention provides a pharmaceutical composition comprising an anthocyanin-anionic polysaccharide complex as an active ingredient for the prevention or treatment of influenza virus A infection disease.

The present invention also provides a food composition, a health functional food composition or a health supplement food composition comprising an anthocyanin-anionic polysaccharide complex as an active ingredient for the prevention or amelioration of influenza virus A infection disease.

The present invention also provides a quasi-drug composition comprising an anthocyanin-anionic polysaccharide complex as an active ingredient for the prevention of influenza virus A infection.

The present invention also provides a method for preventing or treating influenza virus A infection disease comprising a step of administering the pharmaceutical composition comprising an anthocyanin-anionic polysaccharide complex as an active ingredient for the prevention or treatment of influenza virus A infection disease to a mammal including humans in a therapeutically effective amount.

The present invention also provides a use of the pharmaceutical composition comprising an anthocyanin-anionic polysaccharide complex as an active ingredient for the prevention or treatment of influenza virus A infection disease for the manufacture of a preparation for influenza virus A infection disease.

In addition, the present invention provides a use of the pharmaceutical composition comprising an anthocyanin-anionic polysaccharide complex as an active ingredient for the prevention or treatment of influenza virus A infection disease for the treatment of influenza virus A infection disease.

Hereinafter, the present invention is described in detail.

A Pharmaceutical Composition Comprising an Anthocyanin-Anionic Polysaccharide Complex as an Active Ingredient for the Prevention or Treatment of Influenza Virus a Infection Disease The present invention provides a pharmaceutical composition comprising an anthocyanin-anionic polysaccharide complex as an active ingredient for the prevention or treatment of influenza virus A infection disease.

In the present invention, the 'anthocyanin' is a water-soluble pigment glycoside present in a plant, and refers to a natural plant pigment that exhibits colors such as purple, red, and blue depending on the acid concentration of the cell fluid, the chemical structure of the pigment compound, and the binding state with various metal ions. Recently, it is known that anthocyanin has various physiological activities, and for example, anti-aging activity, antibacterial activity, mutagenic inhibitory activity, cholesterol lowering activity, visual acuity improvement effect, blood vessel protection function, and anti-ulcer function have been identified.

In the present invention, the said anthocyanin may be isolated and extracted from a plant or chemically synthesized. The plant can include any plant that produces anthocyanin, and can be, for example, black rice, black bean, black currant, chokeberry, black chokeberry, cranberry, aronia, mulberry, cherry, raspberry, blueberry, blackberry, eggplant, acai, wild grape or grape, preferably aronia.

In the present invention, the type of the said anthocyanin is not particularly limited, but can be selected from the group consisting of peonidin, cyanidin 3-arabinoside, cyanidin-3-(xylosylglucose)-5-galactose, cyanidien-3-xyloside, cyanidin3-glucoside, cyanidin 3-galactoside, cyanidin-3-(coumaroyl-xylosylglucose)-5-galactose, delphinidin 3-glucoside, delphinidin 3-rutinoside, peonidin 3-arabinoside, peonidin 3-galactoside, petunidin 3-glucoside, cyanidin, delphinidin, malvidin, pelargonidin, peonidin, cyanidin 3,5-diglucoside, cyanidin 3-rutinoside, pelargonidin 3-glucoside, peonidin 3-glucoside, malvidin 3-glucoside and malvidin 3,5-diglucoside.

In the present invention, the said anionic polysaccharide is not particularly limited as long as it has biocompatibility, and may include one or more negatively charged functional groups. The term 'polysaccharide' refers to a polymer of two or more monosaccharide molecules, wherein the monosaccharides can be the same or different. The polysaccharide of the present invention can or cannot be cross-linked.

The complex of the present invention can be formed by using anionic polysaccharide itself, or by introducing a chemical modification to a general polysaccharide containing no or a small amount of negatively charged functional groups to impart negatively charged functional groups. The negatively charged functional group may be, for example, one or two or more carboxyl groups or sulfate groups.

In a specific example, the said anionic polysaccharide can be selected from the group consisting of hyaluronic acid, o-sulfated hyaluronic acid (o-sulfated HA), dextran sulfate, chondroitin sulfate, dermatan sulfate, keratin sulfate, heparin, heparin sulfate, alginic acid, fucoidan, carrageenan, mixtures thereof, and complexes thereof, preferably alginic acid, but not always limited thereto.

The anionic polysaccharide is a material frequently used in foods and beverages, and is not only harmless to the human body, but also has a strong negative charge in a neutral solution, so that it can form a complex by effectively ionic bonding with positively charged anthocyanin.

The polysaccharide is not particularly limited, but may have a weight average molecular weight in the range of about 1000 to 1,000,000, preferably in the range of about 10000 to 300,000, and more preferably in the range of 20,000 to 50,000.

In the anionic polysaccharide of the present invention, the encapsulation rate of anthocyanin can be controlled by adjusting the ionic bonding ratio with anthocyanin using the type and number of negative charges of the polysaccharide. Accordingly, as long as it is a polysaccharide having a negative charge, one or more types of polysaccharides having various molecular weights can be used depending on the purpose. The weight ratio of anthocyanin and anionic polysaccharide in the complex can be 1:1 to 100, preferably 1:1 to 50, more preferably 1:1 to 10, and most preferably 1:5 to 10. Within the above range, the complex formed from the polysaccharide of the present invention may exhibit advantageous effects in terms of enhancing the stability and physiological activity of anthocyanin.

Anthocyanin has high stability at low pH, and is known to have the highest stability and highest antioxidant activity, especially at pH 3 or lower. In addition, since anthocyanin has a positive charge at pH 3 or less, it can be structurally stable by forming a complex through an ionic bond with an anionic polysaccharide having biocompatibility. Because the anthocyanin-anionic polysaccharide nanocomplex has excellent oxidative stability and storage stability, it is possible to improve processing conditions and storage properties when it is applied to pharmaceuticals or food. In addition, when the complex is used, in vivo absorption can be increased due to the stability enhancement, which may be very useful for drug development.

In the present invention, the complex may have a size in the range of 10 nm to 1000 μm, and anthocyanin may be encapsulated by polysaccharides, but not always limited thereto. The anthocyanin-polysaccharide complex according to the present invention can be a suspension or powder depending on the purpose or field of use.

In some cases, the anthocyanin-polysaccharide complex can further include a biocompatible or biodegradable carrier. In this case, the anthocyanin-polysaccharide complex is in or a part of the carrier, and the carrier can be a liposome, a micelle, or a polymerized vesicle.

In the most preferred form of the complex of the present invention, the anionic polysaccharide can be alginic acid, the weight average molecular weight is in the range of 20,000 to 50,000, and the anthocyanin can be cyanidin glycoside, preferably cyanidin-3-galactoside, cyaniding-3-glucoside, cyaniding-3-arabinoside and/or cyaniding-3-xyloside.

The cyanidin glycoside can form a complex by ionic bonding with anionic polysaccharide.

In the present invention, the anthocyanin-anionic polysaccharide complex can be prepared by a method comprising the following steps, although the preparation method is not particularly limited:

(i) forming an anthocyanin-anionic polysaccharide complex in acidic environment; and/or (ii) recovering the complex formed above.

In another embodiment, the method for preparing the anthocyanin-polysaccharide complex can include the following step:

(iii) forming an anthocyanin-anionic polysaccharide complex in neutral or acidic environment.

When forming the anthocyanin-anionic polysaccharide complex, the solvent is not particularly limited, but edible ones are better. After preparing polysaccharide and anthocyanin in appropriate proportions, stir the two solutions evenly and wait until the complex is completely formed at about 4° C.

The complex formed by the method of (i) above may maintain an acidic environment as it is in the case of an oral preparation depending on the dosage form, but when used as an injection, it is preferable to neutralize the pH by the method of (ii).

The difference between using the methods of (i) and (iii) is different depending on what kind of functional group the polysaccharide forming the complex has. For example, both methods of (i) and (iii) can be used for the polysaccharides having sulfate group because of their low pKa value, but for the polysaccharides having carboxyl group, it is suitable to use the method of (iii). Although the method of (i) can be used for the polysaccharides having carboxyl group, the complex must be stably formed with anthocyanin only through the process of (ii).

In the present invention, the type of influenza virus A is not particularly limited, but can be H1N1, H1N2, H2N2, H3N2, H5N1, H5N6 or H7N9, preferably H1N1. More preferably, in the present invention, the influenza virus A can be H1N1 A/California/O4/O9 or A/California/7/2009, and most preferably H1N1 A/California/7/2009.

According to an embodiment of the present invention, the anthocyanin-alginic acid complex exhibited significant antiviral efficacy, ie, a synergistic effect, against influenza virus A when compared with anthocyanin or alginic acid alone. On the other hand, it was confirmed that the anthocyanin-alginic acid complex did not show any synergistic effect against influenza B virus.

In the present invention, the influenza virus A infection disease can be flu, cold, laryngopharyngitis, bronchitis, pneumonia, bird flu, swine flu or goat flu, and preferably can be flu, cold, laryngopharyngitis, bronchitis or pneumonia.

Meanwhile, in the present specification, 'comprising as an active ingredient' means including an amount sufficient to achieve the efficacy or activity of the anthocyanin-anionic polysaccharide complex. In one embodiment of the present invention, the anthocyanin-anionic polysaccharide complex in the composition of the present invention is, for example, 0.001 mg/kg or more, preferably 0.1 mg/kg or more, more preferably 10 mg/kg or more, even more preferably 100 mg/kg or more, more preferably 250 mg/kg or more, and most preferably 0.1 g/kg or more. Since the anthocyanin-anionic polysaccharide complex is a natural product and has no side effects even when administered in excess, the upper limit of the quantity of the anthocyanin-anionic polysaccharide complex contained in the composition of the present invention can be selected within an appropriate range by those skilled in the art.

The pharmaceutical composition of the present invention can be prepared using a pharmaceutically suitable and physiologically acceptable adjuvant in addition to the active ingredient. As the adjuvant, an excipient, a disintegrant, a sweetener, a binder, a coating agent, an expanding agent, a lubricant, a slip modifier, or a flavoring agent can be used.

The pharmaceutical composition can be preferably formulated as a pharmaceutical composition by including one or more pharmaceutically acceptable carriers in addition to the active ingredients described above for administration.

The pharmaceutically acceptable carrier is the one that is generally used in the art, which is exemplified by lactose, dextrose, sucrose, sorbitol, mannitol, xylitol, erythritol, maltitol, starch, acacia gum, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate and mineral oil, but not always limited thereto. In addition, the pharmaceutical composition of the present invention can additionally include diluents or excipients such as fillers, extenders, binders, wetting agents, disintegrants and surfactants, and other pharmaceutically acceptable additives.

Formulations of the pharmaceutical composition can be granules, powders, tablets, coated tablets, capsules, suppositories, solutions, syrups, juices, suspensions, emulsions, drops or injectable solutions. For example, for formulation in the form of tablets or capsules, the active ingredient can be combined with an orally, non-toxic, pharmaceutically acceptable inert carrier such as ethanol, glycerol, water, and the like. In addition, if desired or necessary, suitable binders, lubricants, disintegrants and color-developing agents can also be included in the mixture. The suitable binder includes starch, gelatin, natural sugars such as glucose or beta-lactose, corn sweeteners, natural and synthetic gums such as acacia, tracacanth or sodium oleate, sodium stearate, magnesium stearate, sodium benzoate, sodium acetate, sodium chloride, and the like, but not always limited thereto. The disintegrant includes starch, methyl cellulose, agar, bentonite, xanthan gum, and the like, but not always limited thereto.

In the composition formulated as a liquid solution, the pharmaceutically acceptable carrier is sterile and biocompatible, and can be used by mixing saline, sterile water, Ringer's solution, buffered saline, albumin injection, dextrose solution, maltodextrin solution, glycerol, ethanol, and one or more of these components. If necessary, other conventional additives such as antioxidants, buffers, and bacteriostats can be added. In addition, the composition of the present invention can be formulated in different forms including aqueous solutions, suspensions and emulsions for injection, pills, capsules, granules or tablets by mixing with diluents, dispersing agents, surfactants, binders and lubricants.

The composition can further be prepared in suitable forms according to ingredients by following the method represented in Remington's Pharmaceutical Science, Mack Publishing Company, Easton Pa.

The pharmaceutical composition of the present invention can be administered orally or parenterally, and in the case of parenteral administration, it can be administered by intravenous injection, subcutaneous injection, intramuscular injection, intraperitoneal injection, transdermal administration, etc., but oral administration is preferred.

In the present invention, the term 'oral administration' is a method of injecting a drug for alleviating pathological symptoms through the mouth. In the present invention, the term 'parenteral administration' refers to a method of subcutaneous, intramuscular, intravenous, or intraperitoneal administration using a tube, except for oral administration.

The pharmaceutical composition of the present invention can be orally administered to mammals such as rats, mice, livestock, and humans.

For formulations for parenteral administration, sterile aqueous solutions, liquids, non-aqueous solutions, suspensions, emulsions, eye drops, eye ointments, syrups, suppositories, external preparations such as aerosols, and sterilized injections can be prepared by the conventional method, and preferably skin external pharmaceutical compositions such as creams, gels, patches, sprays, ointments, plasters, lotions, liniments, pastes or cataplasms can be prepared, but not always limited thereto. Compositions for topical administration can be anhydrous or aqueous, depending on the clinical prescription. Non-aqueous solutions and suspensions can contain, in addition to the active compound or compounds, propylene glycol, polyethylene glycol, vegetable oil like olive oil, injectable ester like ethylolate, etc. Suppositories can contain, in addition to the active compound or compounds, witepsol, macrogol, tween 61, cacao butter, laurin butter, glycerogelatin, etc.

A suitable dosage of the pharmaceutical composition of the present invention varies depending on factors such as formulation method, administration method, age, weight, gender, pathological condition, food, administration time, administration route, excretion rate and reaction sensitivity of a patient. An effective dosage for the desired treatment or prophylaxis can be easily determined and prescribed by an ordinary skilled doctor. According to a preferred embodiment of the present invention, the daily dose of the pharmaceutical composition of the present invention is 0.001-10 g/kg.

The pharmaceutical composition of the present invention can be formulated by the method that can be performed by those in the art by using a pharmaceutically acceptable carrier and/or excipient in the form of unit dose or in multi-dose container. The formulation can be in the form of solution, suspension or emulsion in oil or water-soluble medium, extract, powder, granule, tablet or capsule. At this time, a dispersing agent or a stabilizer can be additionally included.

A Food Composition Comprising an Anthocyanin-Anionic Polysaccharide Complex as an Active Ingredient for the Prevention or Amelioration of Influenza Virus A Infection Disease The present invention also provides a food composition comprising an anthocyanin-anionic polysaccharide complex as an active ingredient for the prevention or amelioration of influenza virus A infection disease.

In the present invention, the term 'amelioration' refers to any action that improves the bad state of cachexia by administering or ingesting the composition of the present invention to a subject.

The food composition according to the present invention can be formulated in the same manner as the pharmaceutical composition and used as a functional food or added to various foods. For example, the composition of the present invention can be added to beverages, alcoholic beverages, snacks, diet bars, dairy products, meats, chocolates, pizza, ramyuns, other noodles, gums, ice creams, vitamin complex, health supplement food, etc.

The food composition of the present invention can include not only the anthocyanin-anionic polysaccharide complex as an active ingredient, but also ingredients commonly added during food production, for example, proteins, carbohydrates, fats, nutrients, seasonings and flavoring agents. The carbohydrates described above can be one of monosaccharides such as glucose and fructose; disaccharides such as maltose, sucrose and oligosaccharides; polysaccharides such as dextrin and cyclodextrin, and glucose alcohols such as xylytole, sorbitol and erythritol. Besides, natural sweetening agents (thaumatin, stevia extract, for example rebaudioside A, glycyrrhizin, etc.) and synthetic sweetening agents (saccharin, aspartame, etc.) can be included as a sweetening agent. For example, when the food composition of the present invention is prepared as a drink or beverage, citric acid, high fructose corn syrup, sugar, glucose, acetic acid, malic acid, fruit juice, and various plant extracts can be additionally included in addition to the anthocyanin-anionic polysaccharide complex of the present invention.

The present invention provides a health functional food or a health supplement food containing a food composition comprising an anthocyanin-anionic polysaccharide complex as an active ingredient for the prevention or amelioration of influenza virus A infection disease. The said health functional food or health supplement food refers to a food manufactured and processed using raw materials or ingredients useful for the human body according to the health functional foods act. The term 'functional' refers to ingestion for the purpose of obtaining useful effects for health purposes such as regulating nutrients for the structure and function of the human body or physiological effects. In the present invention, the health functional food is a food prepared by adding the anthocyanin-anionic polysaccharide complex to food materials such as beverages, teas, spices, gums, snacks, or the like, or prepared by the anthocyanin-anionic polysaccharide complex in capsules, powders, suspensions, and the like. In case of ingestion of the above food, it brings specific health effects, and unlike general medicines, there are no side effects that may occur when taking the medicine for a long time by using food as a raw material. The health functional food or health supplement food of the present invention obtained in this way is very useful because it can be consumed on a daily basis.

The amount of the anthocyanin-anionic polysaccharide complex added in such health functional food or health supplement food varies depending on the type of the target health functional food and cannot be uniformly defined, but can be added within a range that does not impair the original taste of the food. Specifically, the amount of the complex added is usually in the range of 0.01 to 50 weight %, and preferably 0.1 to 20 weight % based on the target food. In addition, in the case of the health functional food or health supplement food in the form of pills, granules, tablets or capsules, it is usually added in an amount of 0.1 to 100 weight %, and preferably 0.5 to weight %. In one embodiment of the present invention, the health functional food or health supplement food of the present invention can be in the form of pills, tablets, capsules or beverages.

The food composition of the present invention can include conventional food additives. Whether or not it is suitable as a 'food additive' is judged according to the specifications and standards for the relevant items in accordance with the general rules and general test methods of the Food Additives Code approved by the Ministry of Food and Drug Safety, unless otherwise specified.

The items listed in the 'Food Additives Code' include, for example, chemical compounds such as ketones, glycine, potassium citrate, nicotinic acid and cinnamic acid; natural additives such as persimmon pigment, licorice extract, crystalline cellulose, kaoliang color and guar gum; and mixed preparations such as sodium L-glutamate preparations, alkali additives for noodles, preservatives and tar color formulations.

In addition, the food composition of the present invention can be manufactured and processed in the form of tablets, capsules, powders, granules, liquids, and pills for the purpose of preventing and/or ameliorating Influenza virus A infection disease.

For example, the health functional food in the form of tablets can be prepared by granulating a mixture of a pharmaceutical composition comprising the anthocyanin-anionic polysaccharide complex according to the present invention as an active ingredient, an excipient, a binder, a disintegrant, and other additive in a conventional manner, followed by compression molding by adding a lubricant. Alternatively, the mixture can be directly compression molded. In addition, the health functional food in the form of tablets can contain a flavor enhancer, etc., and can be coated with a suitable coating agent if necessary.

Among the health functional food in the form of capsules, hard capsules can be prepared by filling conventional hard capsules with a mixture of a pharmaceutical composition comprising the anthocyanin-anionic polysaccharide complex according to the present invention as an active ingredient and an excipient, the granules thereof or the coated granules thereof. Soft capsules can be prepared by filling capsule base such as gelatin with a mixture of the food composition according to the present invention and additives such as excipients.

The health functional food in the form of pills can be prepared by molding a mixture of a pharmaceutical composition comprising the anthocyanin-anionic polysaccharide complex according to the present invention as an active ingredient, an excipient, a binder, a disintegrant, and the like using an appropriate method. If necessary, the pills can be coated with sucrose or other suitable coating agents, or can be coated with starch, talc or a suitable material.

The health functional food in the form of granules can be prepared by granulating a mixture of a pharmaceutical composition comprising the anthocyanin-anionic polysaccharide complex according to the present invention as an active ingredient, an excipient, a binder, a disintegrant, and the like using an appropriate method, and may contain flavoring agents, flavor enhancers, etc. as necessary. When a particle size test was performed using No. 12 (1680 μm), 14 (1410 μm) and 45 (350 μm) sieves, the total amount of the health functional food granules passed through No. 12 sieve, 5.0% or less of the total amount of the health functional food granules remained on No. 14 sieve, and 15.0% or less of the total amount of the health functional food granules passed through No. 45 sieve.

The term definitions for the excipients, binders, disintegrants, lubricants, flavor enhancers, flavoring agents, and the like are described in documents known in the art and include those having the same or similar functions (The Korean Pharmacopoeia, Moonsung Publishing Co., Korean Association of Pharmacy Education, 5th edition, p 33-48, 1989).

The food herein is not particularly limited, and in wide sense, almost every health functional food can be included.

A Quasi-Drug Composition Comprising an Anthocyanin-Anionic Polysaccharide Complex as an Active Ingredient for the Prevention of Influenza Virus A Infection The present invention also provides a quasi-drug composition comprising an anthocyanin-anionic polysaccharide complex as an active ingredient for the prevention of influenza virus A infection.

That is, the anthocyanin-anionic polysaccharide complex according to the present invention can be added to quasi-drugs for the purpose of preventing Influenza virus A infection. When the composition of the present invention is used as a quasi-drug additive, the composition can be added as it is or used together with other quasi-drugs or quasi-drug ingredients, and can be appropriately used according to the conventional method. The mixing amount of the active ingredient can be appropriately determined according to the purpose of use.

In the present invention, the term 'quasi-drug' refers to one of textiles, rubber products or the like used for the purpose of treating, alleviating, or preventing diseases of humans or animals; things that are not devices or machines having weak action on the human body or do not directly act on the human body, and the like; and preparations used for sterilization, insecticidal and similar purposes to prevent infection. It also means articles other than instruments, machines or devices used for the purpose of diagnosing, treating, alleviating, or preventing diseases of humans or animals; and articles other than instruments, machines, or devices used for the purpose of pharmacologically affecting the structure and function of humans or animals.

In the present invention, the quasi-drug can be specifically a filter coating agent, hand wash, disinfectant cleaner, shower foam, wet tissue, detergent soap, humidifier filler, mask or air freshener, but not always limited thereto.

In the present invention, the quasi-drug composition can be applied to a gas phase filter and used as an antiviral filter.

In the present invention, the term 'gas phase filter' refers to a filter for removing microorganisms and dust from the air to prevent the inflow of dangerous substances or pollutants such as microorganisms and dust from the outside, and to prevent secondary contamination by the filter. Therefore, the gas phase filter according to the present invention can be used as a gas phase filter for automobiles, a gas phase filter for home appliances, a gas phase filter for air conditioners, a gas phase filter for gas masks, a gas phase filter for air purifiers, or a gas phase filter for clean rooms, and preferably can be used as a gas phase filter for air purifiers.

As the filter substrate, metals, plastics, nonwoven fabrics, films, or the like can be used. As a gas phase filter for air purifiers, a nonwoven fabric having high porosity can be preferably used, but not always limited thereto.

In order to manufacture a gas phase filter, first, the quasi-drug composition for preventing influenza virus infection according to the present invention is prepared. The quasi-drug composition for preventing influenza virus infection is preferably dissolved or diluted in a certain solvent to be used in the form of a solution to prepare a gas phase filter.

As the solvent, water, ethanol, methanol, butanol or n-hexane, n-heptane, DMSO, or a mixed solvent thereof can be used.

A filter substrate is coated with the quasi-drug composition for the prevention of influenza virus infection. As a coating method, a method of coating the filter substrate by immersing a roller having an absorbent member such as a sponge on the outside thereof in the composition, then rolling the roller on a filter substrate and drying thereof to coat a substrate, a method of coating the filter substrate by directly dipping thereof in the composition and drying thereof, or a method of coating the filter substrate by spraying the composition onto the filter substrate and drying thereof can be used.

In addition to the composition of the present invention, the filter can further include an existing antibacterial substance, a deodorant (eg, flavonoid, phytoncide, pyroligneous liquor, plant extract, cyclodextrin, metal ion, titanium dioxide, etc.) or a dust collection filter.

A Method for Preventing or Treating Influenza Virus A Infection Disease

The present invention provides a method for preventing or treating influenza virus A infection disease comprising a step of administering the pharmaceutical composition comprising an anthocyanin-anionic polysaccharide complex as an active ingredient for the prevention or treatment of influenza virus A infection disease to a mammal including humans in a therapeutically effective amount.

In this specification, the term 'therapeutically effective amount' is an amount effective for preventing or treating an infectious disease caused by Influenza virus A, for example, an amount of a pharmaceutical composition for preventing or treating influenza virus A infection disease comprising an anthocyanin-anionic polysaccharide complex as an active ingredient administered to a subject to be treated. The therapeutically effective amount includes an amount that prevents the occurrence or recurrence of an infectious disease caused by Influenza virus A, an amount that alleviates the symptoms, an amount that inhibits direct or indirect pathological consequences, an amount that prevents the metastasis, an amount that reduces the rate of progression, an amount that alleviates or temporarily ameliorates the state, and an amount of the pharmaceutical composition for preventing or treating influenza virus A infection disease comprising an anthocyanin-anionic polysaccharide complex as an active ingredient that improves the prognosis. That is, the therapeutically effective amount can be interpreted as encompassing all amounts that improve or cure the symptoms of infectious diseases caused by Influenza virus A by the pharmaceutical composition for preventing or treating influenza virus A infection disease comprising an anthocyanin-anionic polysaccharide complex as an active ingredient.

A method of preventing or treating an infectious disease caused by Influenza virus A includes not only controlling the disease itself before the onset of the symptoms, but also inhibiting or avoiding the symptoms by administering the pharmaceutical composition for preventing or treating influenza virus A infection disease comprising an anthocyanin-anionic polysaccharide complex as an active ingredient. In the management of a disease, the prophylactic or therapeutic dose of a particular active ingredient may vary depending on the nature and severity of the disease and the route by which the active ingredient is administered. The dose and frequency of dose may vary according to the age, weight and response of an individual patient. A suitable dosage regimen can be readily selected by one of ordinary skill in the art taking these factors into account. In addition, the prophylactic or therapeutic method of the present invention can further include administration of a therapeutically effective amount of an additional active agent useful for the prevention or treatment of infectious diseases caused by Influenza virus A together with the pharmaceutical composition for preventing or treating influenza virus A infection disease comprising an anthocyanin-anionic polysaccharide complex as an active ingredient. The additional active agent can exhibit a synergistic or additive effect with the pharmaceutical composition for preventing or treating influenza virus A infection disease comprising an anthocyanin-anionic polysaccharide complex as an active ingredient.

The mammals including humans include mammals such as humans, monkeys, cattle, horses, dogs, cats, rabbits, and rats.

A Use of the Pharmaceutical Composition for the Prevention or Treatment of Influenza Virus A Infection Disease The present invention provides a use of the pharmaceutical composition comprising an anthocyanin-anionic polysaccharide complex as an active ingredient for the prevention or treatment of influenza virus A infection disease for the manufacture of a preparation for influenza virus A infection disease.

The present invention provides a use of the pharmaceutical composition comprising an anthocyanin-anionic polysaccharide complex as an active ingredient for the prevention or treatment of influenza virus A infection disease for the treatment of influenza virus A infection disease.

The pharmaceutical composition comprising an anthocyanin-anionic polysaccharide complex as an active ingredient for the prevention or treatment of influenza virus A infection disease of the present invention for the manufacture of a preparation for influenza virus A infection disease can be mixed with an acceptable carrier and the like, and can further include other agonists.

Those mentioned in the pharmaceutical composition, food composition, quasi-drug composition, prophylactic or therapeutic method and use of the present invention are equally applied as long as they do not contradict each other.

Advantageous Effect

The composition comprising an anthocyanin-anionic polysaccharide complex as an active ingredient provided in the present invention exhibits excellent anti-viral activity against influenza virus A and as such, can find very advantageous applications in developing an agent for prevention or treatment of diseases caused by influenza virus A infection.

DESCRIPTION OF THE PREFERRED EMBODIMENTS

Hereinafter, the present invention will be described in detail by the following examples and experimental examples.

However, the following examples and experimental examples are only for illustrating the present invention, and the contents of the present invention are not limited thereto.

Example 1: Preparation of Anthocyanin-Anionic Polysaccharide Nanocomplex

Anthocyanin was obtained by crushing the raw fruit of aronia, adsorbing the juice to a polyphenol adsorption resin, eluting thereof with an ethyl alcohol aqueous solution, and pulverizing thereof. 20 mg of the anthocyanin powder prepared above was dissolved in 5 ml of phosphate buffer (pH 3, PB 3) at 40° C., and 200 mg of alginic acid (anionic polysaccharide) was dissolved in 10 ml of deionized water (D.I water) at room temperature. An anthocyanin-anionic polysaccharide nanocomplex was prepared by adding the anthocyanin solution to the alginic acid solution (1:1, V/V), followed by stirring at room temperature for 48 hours.

Figure 1:
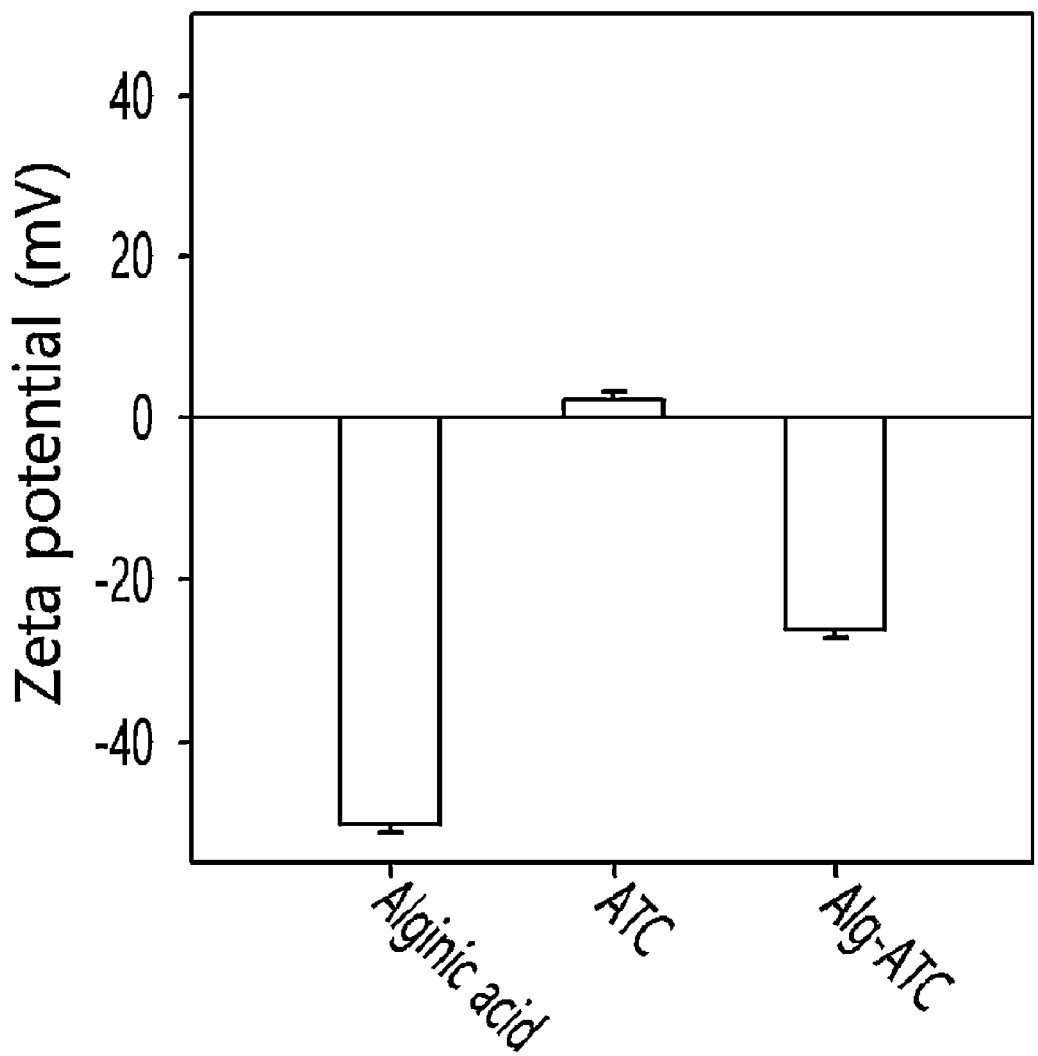
FIG. 1 is a diagram showing the zeta potential of alginic acid, anthocyanin, anthocyanin-alginic acid complex.
Figure 2:
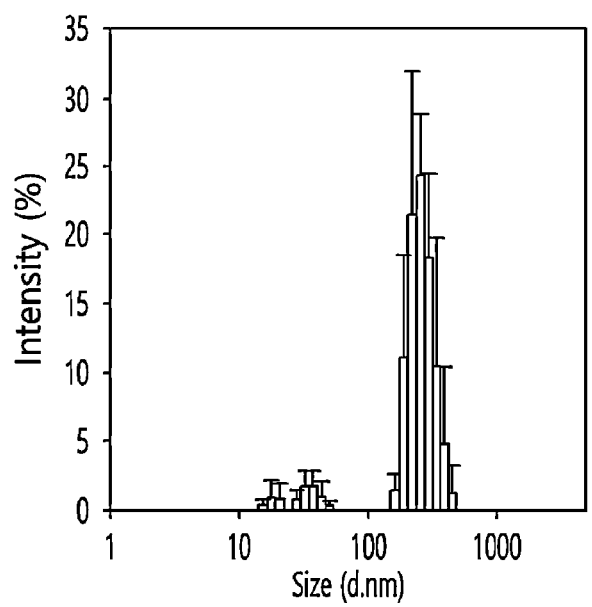
FIG. 2 is a graph showing the results of measuring the size of anthocyanin-alginic acid complex particles using a DLS device (ATC: anthocyanin, ATC/Alg complex: anthocyanin-alginic acid complex).

Example 2: Measurement of Particle Size of Anthocyanin-Anionic Polysaccharide Nanocomplex The particle size distribution of the anthocyanin-alginic acid nanocomplex prepared in Example 1 was measured using Zeta sizer Nano Zs (Malvern Instruments Ltd, UK), a dynamic light scattering (DLS) measuring device. As a result of measuring the anthocyanin-alginic acid nanocomplex particle size using a DLS measuring device, the complex particle size was about 360 nm. As alginic acid (−50±1.66 mV) formed a complex with anthocyanin (2.3±1.01 mV), the negative charge strength of alginic acid was decreased, and the zeta potential of the complex was −26.4±1.17 mV (FIG. 1,2).

Example 3: Confirmation of Anthocyanin-Anionic Polysaccharide Nanocomplex Formation 1 ml of the complex prepared in Example 1 was put into a UV cuvette, and the maximum absorbance wavelength band of anthocyanin was confirmed through a spectrophotometer. The anthocyanin solution dissolved in PB 3/D.I water (1:1 volume) was also subjected to the same process as above, and the changes of the color of the solution and the maximum absorbance wavelength band were confirmed as the complex was formed.

Figure 3:
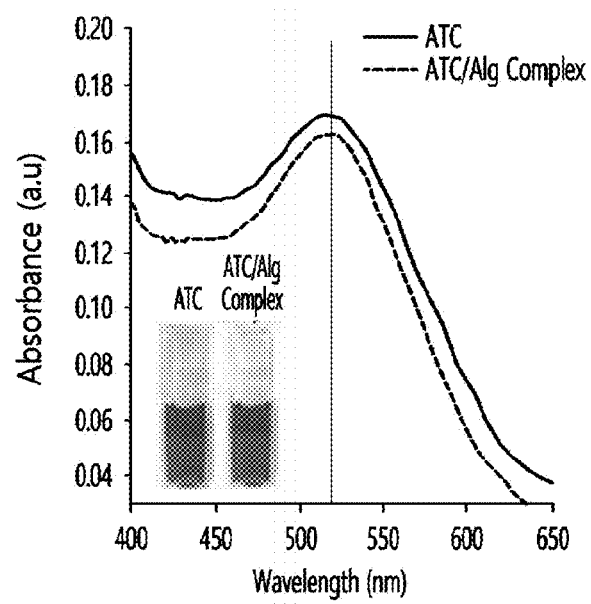
FIG. 3 is a graph showing the results of confirming the formation of anthocyanin-alginic acid complex particles on the first day using a spectrophotometer (ATC: anthocyanin, ATC/Alg complex: anthocyanin-alginic acid complex).
Figure 4:
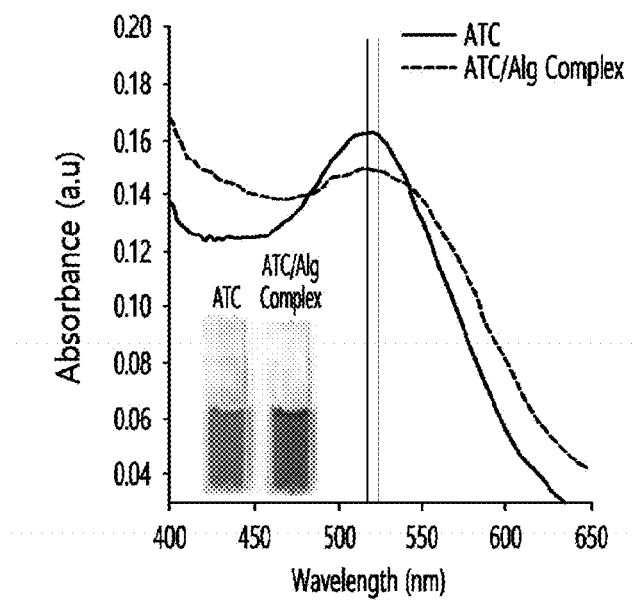
FIG. 4 is a graph showing the results of confirming the formation of anthocyanin-alginic acid complex particles on the 5th day using a spectrophotometer (ATC: anthocyanin, ATC/Alg complex: anthocyanin-alginic acid complex).

As a result, it was observed that the anthocyanin-alginic acid complex was formed by the ionic bond created by the cationicity of anthocyanin and the anionicity of alginic acid, and the maximum absorbance of anthocyanin moved to a longer wavelength due to the π-π interaction between anthocyanin molecules, and thus the sample that formed the complex was slightly purple. Therefore, it was confirmed that the anthocyanin-alginic acid complex was formed (FIG. 3, 4).

Example 4: Confirmation of Stability of Anthocyanin-Anionic Polysaccharide Nanocomplex Over Time The amount of anthocyanin was confirmed using a spectrophotometer to confirm the stability of the complex prepared in Example 1 over time. 40 ml of the anthocyanin-alginic acid complex was centrifuged at 13000 rpm for 30 minutes, and the precipitate was dispersed in PBS (pH 3 or pH 7.4). In addition, anthocyanin was prepared by dissolving thereof in PBS (pH 3 or pH 7.4). The absorbance of the complex and anthocyanin dispersed in PBS (pH 3 or pH 7.4) was measured with a spectrophotometer at each wavelength band of 513 nm or 520 nm, respectively, and the change in the absorbance value of anthocyanin was observed.

Figure 5:
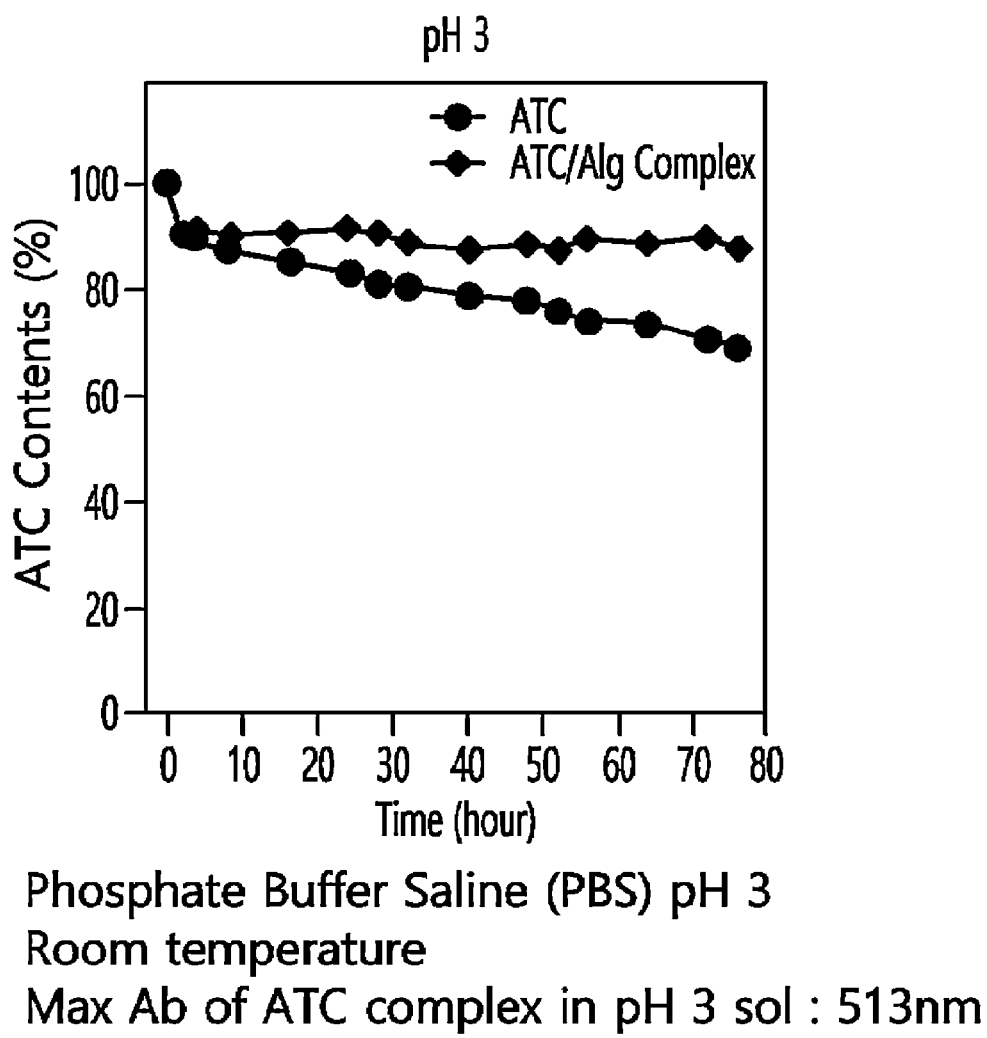
FIG. 5 is a graph showing the results of confirming the stability of anthocyanin-alginic acid complex particles at pH 3 using a spectrophotometer (ATC: anthocyanin, ATC/Alg complex: anthocyanin-alginic acid complex).
Figure 6:
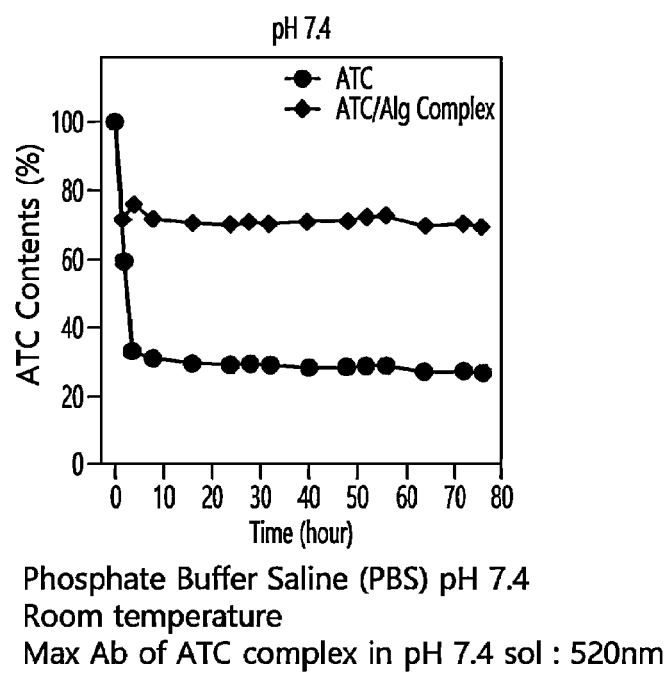
FIG. 6 is a graph showing the results of confirming the stability of anthocyanin-alginic acid complex particles at pH 7.4 using a spectrophotometer (ATC: anthocyanin, ATC/Alg complex: anthocyanin-alginic acid complex).

As a result, it was confirmed that anthocyanin was stable in a low pH environment (pH 3). Specifically, after 76 hours in a low pH environment (pH 3), the complex contained 18.7% more anthocyanin and was more stable. Since decomposition occurs as the pH increases, the maximum absorbance of anthocyanin was significantly decreased within 4 hours at pH 7.4, whereas that of the complex showed a small decrease. After 4 hours, it was confirmed that anthocyanin and complex decreased at a similar rate. As a result of expressing the maximum absorbance of anthocyanin as a percentage, it was found that anthocyanin contained 42.5% less anthocyanin than the complex within 4 hours at pH 7.4. Therefore, it was confirmed that the complex has higher stability than anthocyanin (FIG. 5, 6).

Example 5: Confirmation of Inhibitory Effect of Anthocyanin-Anionic Polysaccharide Nanocomplex on Intracellular Viral Infection In order to confirm the antiviral effect of the anthocyanin-alginic acid complex prepared in Example 1, a plaque reduction assay for influenza virus was performed. First, a 12-well cell culture dish filled with a monolayer of MDCK cells was prepared. After mixing the prepared anthocyanin-alginic acid complex with influenza A virus (A/California/07/2009, H1N1) by concentration, 0.1 mL each was placed in a 12-well cell culture dish with MDCK cells, and the cells were infected with the virus for 1 hour and 30 minutes. As a comparative group, alginic acid and anthocyanin forming the complex were also performed in the same manner as above at the same concentration. After 1 hour and 30 minutes, 1.5 mL of 1% agarose gel containing serum-free DMEM was added to each well and hardened. After culturing the cells for 72 hours in a 37° C., 5% $CO_2$ incubator, a cell fixative solution (methanol:acetic acid=3:1) and a crystal violet solution were mixed (1:1), and 2 mL each was put on the solid gel and stained for 24 hours. After removing and washing the gel in the well, the number of plaques, which are unstained parts, was counted. The same method was carried out with influenza B virus. As a positive control, oseltamivir was used.

A decrease in the number of plaques means a decrease in the number of viruses having infectivity.

Figure 7:
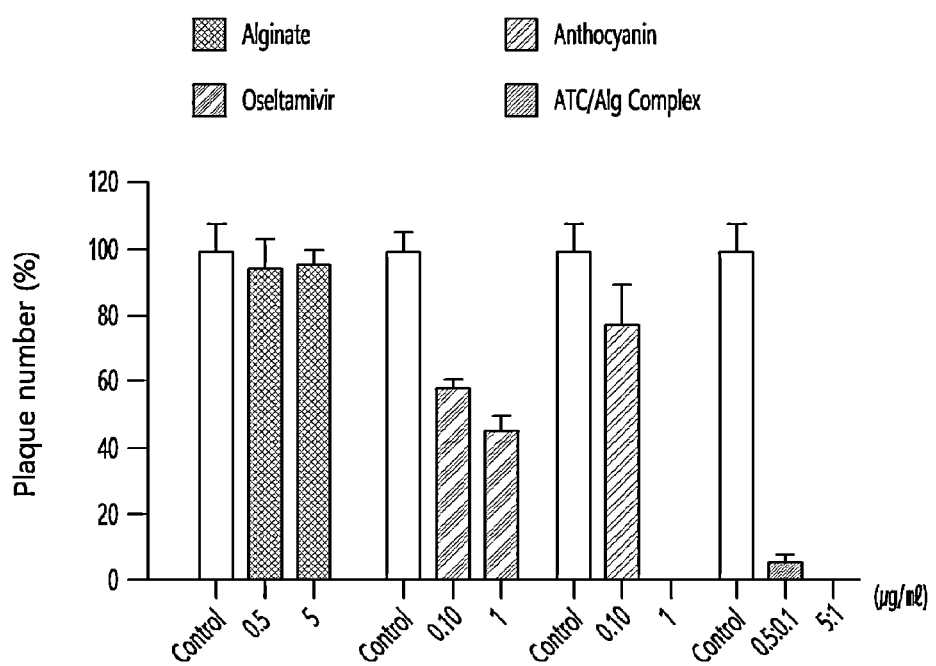
FIG. 7 is a graph showing the results of confirming the inhibitory effect of the anthocyanin-alginic acid complex on influenza virus A (H1N1) through a plaque reduction assay.

As shown in FIG. 7, anthocyanin showed a significant antiviral effect against influenza virus A from a concentration of 1 µg/ml or higher, and alginic acid, a substance for maintaining stability of anthocyanin, did not show an antiviral effect. In the case of the anthocyanin-alginic acid complex treatment group, it was confirmed that Influenza virus A was remarkably inhibited even in the concentration combination (alginic acid 0.5 ug/ml+anthocyanin 0.1 ug/ml) that showed little effect in each single administration group. From the above results, it was confirmed that the anthocyanin-alginic acid complex exhibited a synergistic effect in the antiviral effect against influenza virus A. In particular, it was confirmed that the antiviral effect of the anthocyanin-alginic acid complex against influenza virus A was significantly superior to that of oseltamivir used as a positive control even at a lower concentration.

Figure 8:
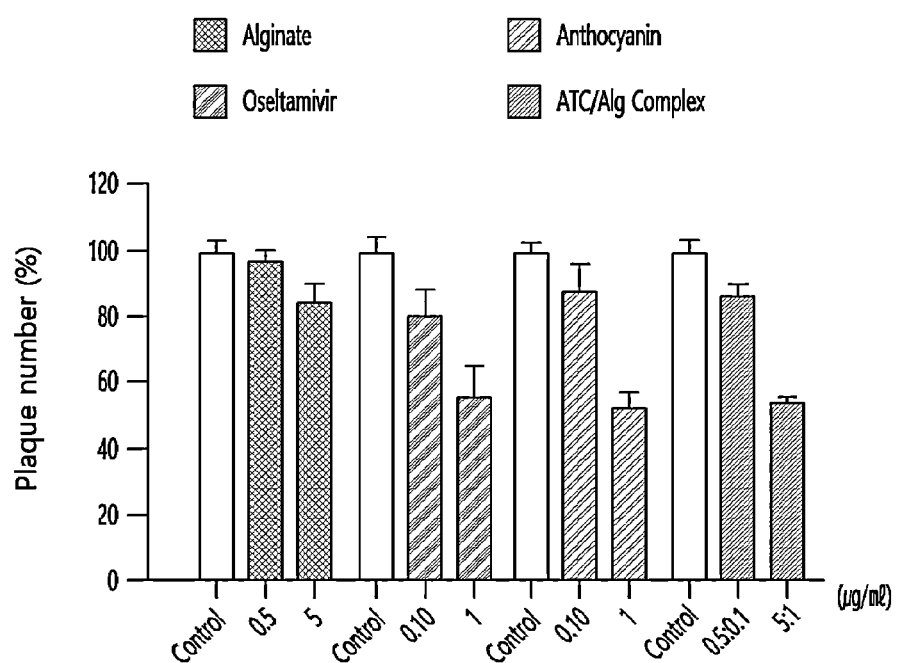
FIG. 8 is a graph showing the results of confirming the inhibitory effect of the anthocyanin-alginic acid complex on influenza virus B through a plaque reduction assay.

As shown in FIG. 5 FIG. 8, alginic acid showed an antiviral effect at a certain concentration or higher against influenza B virus unlike influenza A virus, and anthocyanin also showed an antiviral effect of about 50% at a concentration of 1 µg/ml or higher. In the case of the anthocyanin-alginic acid complex treatment group, the synergistic effect of the combination of alginic acid and anthocyanin did not appear, and the anthocyanin-alginic acid complex treatment showed only an antiviral effect similar to that of the anthocyanin alone treatment.

INDUSTRIAL APPLICABILITY

A composition comprising an anthocyanin-anionic polysaccharide complex as an active ingredient provided in the present invention exhibits excellent anti-viral activity against influenza virus A and as such, can find very advantageous applications in developing an agent for prevention or treatment of diseases caused by influenza virus A infection.

What is claimed is:

1. A method for treating a disease caused by influenza virus A infection, the method comprising administering to a mammal having an influenza virus A disease a therapeutically effective amount of a pharmaceutical composition comprising an anthocyanin-anionic polysaccharide complex as an active ingredient, wherein the weight ratio of anthocyanin to anionic polysaccharide in the complex is 1:1 to 1:100,
   wherein the anthocyanin is derived from aronia and the anionic polysaccharide is an alginic acid, and
   wherein the anthocyanin is cyanidin 3-galactoside, cyanidin 3-glucoside, cyanidin 3-arabinoside, cyanidin 3-xyloside, or combinations thereof,
   wherein the anthocyanin-anionic polysaccharide complex provides increased antiviral efficacy against influenza virus A compared to the anthocyanin alone, anionic polysaccharide alone, and compared to antiviral efficacy of the anthocyanin-anionic polysaccharide complex against influenza virus B.

2. The method according to claim 1, wherein the disease is a least one selected from the group consisting of flu, cold, laryngopharyngitis, bronchitis, pneumonia, bird flu, swine flu, and goat flu.

3. A method of treating an influenza virus A infection, the method comprising administering a therapeutically effective amount of a pharmaceutical composition comprising an anthocyanin-anionic polysaccharide complex to a mammal infected with the influenza virus A, wherein the weight ratio of anthocyanin to anionic polysaccharide in the complex is 1:1 to 1:100,
   wherein the anthocyanin is derived from aronia and the anionic polysaccharide is an alginic acid, and
   wherein the anthocyanin is cyanidin 3-galactoside, cyanidin 3-glucoside, cyanidin 3-arabinoside, cyanidin 3-xyloside, or combinations thereof,
   wherein the anthocyanin-anionic polysaccharide complex provides increased antiviral efficacy against influenza virus A compared to the anthocyanin alone, anionic polysaccharide alone, and compared to antiviral efficacy of the anthocyanin-anionic polysaccharide complex against influenza virus B.

4. The method according to claim 3, wherein the influenza virus A is an influenza virus A subtype H1N1.

5. The method according to claim 3, wherein the weight ratio of anthocyanin to anionic polysaccharide in the complex is 1:1 to 1:10.

* * * * *